Nov. 16, 1965  E. R. DE VRIES  3,218,186
MOISTUREPROOFING REFLECTIVE MARKERS
Filed Aug. 16, 1962
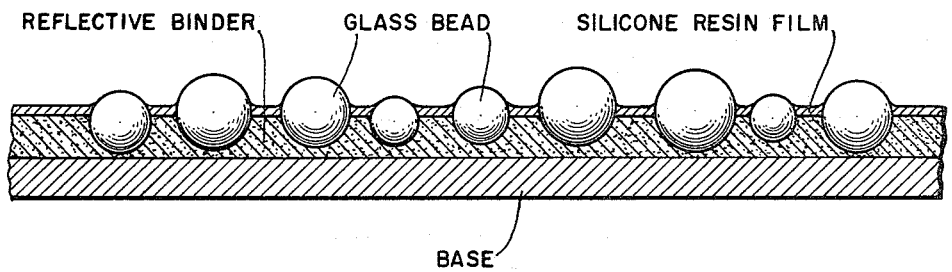
INVENTOR
Eduard R. DeVries
BY Karl W. Flocks
ATTORNEY

3,218,186
MOISTUREPROOFING REFLECTIVE MARKERS

Eduard R. de Vries, Huntingdon, Pa., assignor to Prismo Safety Corporation, Huntingdon, Pa., a corporation of Pennsylvania
Filed Aug. 16, 1962, Ser. No. 217,282
7 Claims. (Cl. 117—29)

The present invention relates to reflective markers and more particularly to a method of moisture-proofing reflectorized markers and the resulting moisture-proofed marker.

Heretofore, it has been suggested to moisture proof reflectorized markers which are coated with glass beads by covering the entire face surface of the marker, including the glass beads, with a transparent clear binder coating. Although the moisture proofing obtained is quite satisfactory, a disadvantage of this process is that the reflectivity is lost to a substantial amount because of the clear binder coating. It has also been proposed to treat the glass beads to render them moistureproof before they are applied to the marker. This results in free flowing beads even in moist atmospheres, and results in a marker that has a certain amount of moistureproofness, however the spaces between the beads are not moistureproofed.

It has been found that it is most important for water repellancy of a complete glass bead reflectorized marker that the spaces between the beads be moistureproofed. It is therefore an object of the present invention to provide a novel method of moistureproofing reflectorized markers without loss of reflectivity.

Another object of the present invention is to provide a novel moistureproofed reflectorized marker.

Other objects and the nature and advantages of the present invention will be apparent from the following description of the invention.

The figure shown in the drawings is a diagrammatic cross-sectional view of a marker which has been treated in accordance with the present invention.

In accordance with this invention, it has been found that excellent moistureproofing of a marker having exposed glass bead surfaces can be obtained by applying a water emulsion of a silicone resin onto the reflectorized marker. It has been found that the droplets of silicone resin solution will roll off of the tops of the exposed half of the glass beads in the marker and collect in the spaces between the glass beads so that upon evaporation of the water and solvent, a continuous layer or film inbetween the glass beads will form leaving the tops of the glass beads essentially free of any surface layer.

The silicone resin is first formed into a solution in a solvent, such as naphtha, which is then emulsified into water to form an emulsion in which the water is the continuous outer phase and the silicone resin solution forms droplets as the inner phase. The silicone used may be any of the hardening silicone resins, or curing silicone rubbers which are first formed into a solution in a suitable organic solvent which is of course immiscible with water. When the term "silicone resin" is used in the specification and claims, it is meant to include any of the above silicones.

An example of a suitable coating composition is as follows:

| | Parts by Weight |
|---|---|
| Silicone resin in solvent— (50–70% solids) (Dow Corning DC–1107) | 100 |
| Emulsifying agent— (oleic acid and triethanol amine) | 5 |
| Water | 100 |

After the composition has been coated onto the outer surface of a sign, the sign is baked until the silicone resin has solidified.

When the silicone resin is a heat hardenable liquid, the solvent in which it is dissolved may be eliminated, and the emulsion of this resin in the water may be directly made.

When the emulsion of the silicone solution in water is sprayed or brushed onto a sign reflectorized with glass beads, the water which is the outer phase of the emulsion immediately wets the exposed surfaces of the glass beads which are hydrophilic. The silicone resin solution droplets will roll off of the tops of the exposed wetted half of the glass beads and collect in the spaces between the glass beads. Now when evaporation takes place, both the water and the solvent in which the silicone is dissolved will evaporate and the silicone resin will form a continuous film between the glass beads leaving the tops of the glass beads free of any surface layer. This results in excellent water proofing of the sign without any deterioration of reflectivity or loss of light on reflectivity. At the same time the spaces between the beads are filled somewhat to yield a more nearly flat surface which is more effective for water repellancy.

Thus, it is seen that even though a coating of the emulsion is applied to the entire face of the marker, the resulting moisture-proofed marker has no coating on the exposed surfaces of the glass beads.

It will be obvious to those skilled in the art that various changes may be made without departing from the spirit of the invention and therefore the invention is not limited to what is shown and described in the specification, but only as indicated in the appended claims.

What is claimed is:

1. A method of moistureproofing markers which are reflectorized by exposed glass beads partially embedded in a layer of binder to form the outer surface of the marker which comprises applying a coating of a water emulsion of a silicone resin onto the surface of the marker, the silicone resin being the inner phase of the emulsion, the glass beads having hydrophilic exposed surfaces whereby the exposed hydrophilic glass bead surfaces wetted by the water phase shed the silicone resin so that upon drying a silicone resin film forms in the space between the glass beads but not on the outer exposed surfaces of the glass beads.

2. A method in accordance with claim 1 wherein the silicone resin is in solution in an organic solvent and said silicone resin solution in the solvent is the inner phase of the emulsion.

3. A method in accordance with claim 1 wherein after coating the marker with the emulsion it is baked until dry.

4. A method in accordance with claim 2 wherein after coating the marker with the emulsion it is baked until dry.

5. A moisture-proofed reflectorized marker comprising a layer of binder having a plurality of glass beads partially embedded in the outer surface thereof, the surfaces of the binder between said glass beads having a coating of a solidified silicone resin thereon and the exposed outer surfaces of said glass beads being hydrophilic and having no coating thereon.

6. A method of moistureproofing reflective markers which comprise an outer surface of a binder layer in which a plurality of small hydrophilic transparent glass beads are partially embedded, which method comprises applying a coating of a water emulsion of a silicone resin onto the outer surface of the marker, the silicone resin being the inner phase of the emulsion, and curing said silicone resin whereby the exposed hydrophilic glass bead surfaces wetted by the water phase act to shed the silicone resin so that upon curing the silicone resin forms a solid film over the binder between the glass beads but not on the outer surfaces of the glass beads.

7. A method in accordance with claim 6 wherein after coating the outer surface of the marker with the emulsion, it is heated until the silicone resin is cured and the water is evaporated.

References Cited by the Examiner
UNITED STATES PATENTS

| | | | |
|---|---|---|---|
| 1,902,440 | 3/1933 | Gill | 88—82 |
| 2,379,702 | 7/1945 | Gebhard | 117—29 |

OTHER REFERENCES

H. W. Post: "Silicones and Other Organic Silicon Compounds," p. 108 (Reinhold Publishing Corporation, 1949).

E. G. Rochow: "Chemistry of the Silicones," p. 87, (John Wiley and Sons Inc., 1947).

RICHARD D. NEVIUS, *Primary Examiner.*

Dedication 3,218,186.—*Eduard R. De Vries*, Huntingdon, Pa. MOISTUREPROOFING REFLECTIVE MARKERS. Patent dated Nov. 16, 1965. Dedication filed Apr. 13, 1976, by the assignee, *Prismo Universal Corporation*.
Hereby dedicates to the Public the entire term of said patent.
[*Official Gazette July 6, 1976.*]